June 16, 1925.
L. B. LE DUKE
1,542,309
SPRAYING APPARATUS
Filed June 28, 1924
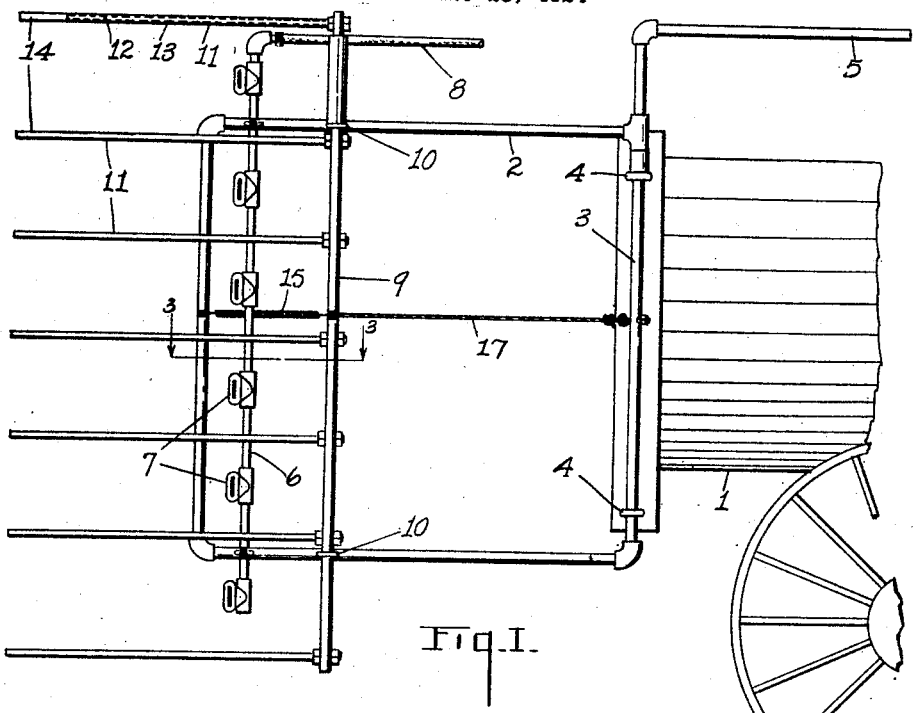
Fig. I.
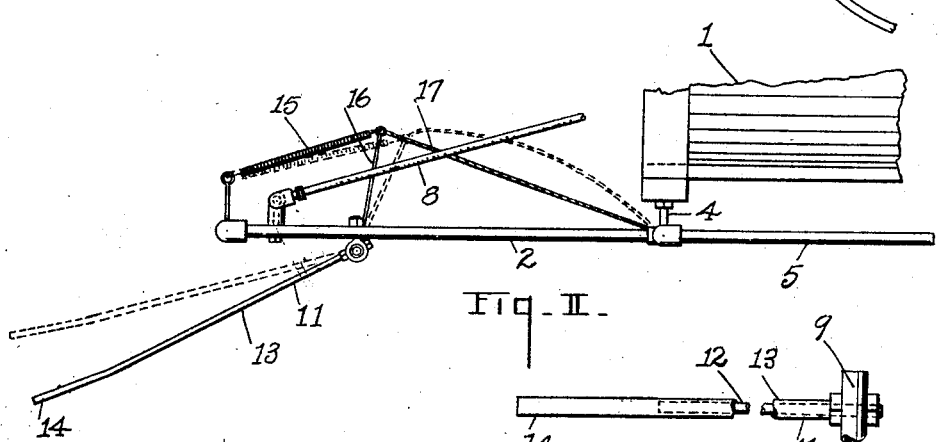
Fig. II.
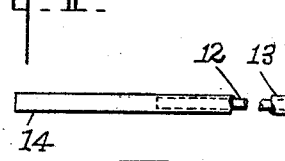
Fig. IV.
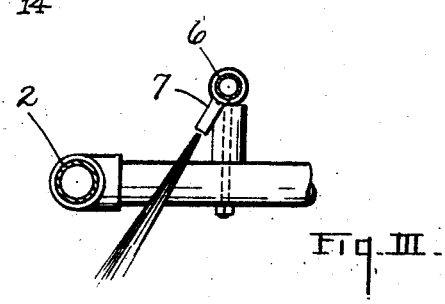
Fig. III.
INVENTOR
Lawrence B. LeDuke
BY
Chappell Head
ATTORNEYS Patented June 16, 1925.

1,542,309

UNITED STATES PATENT OFFICE.

LAWRENCE B. LE DUKE, OF LAWRENCE, MICHIGAN.

SPRAYING APPARATUS.

Application filed June 28, 1924. Serial No. 722,958.

*To all whom it may concern:*

Be it known that I, LAWRENCE B. LE DUKE, a citizen of the United States, residing at Lawrence, county of Van Buren, State of Michigan, have invented certain new and useful Improvements in Spraying Apparatus, of which the following is a specification.

This invention relates to improvements in spraying apparatus.

It is necessary for certain diseases and pests to spray grape vines while in leaf and great difficulty has been experienced in effectively doing this as the leaves form a shield or covering which prevents the spray from reaching the desired portions of the vines and leaves.

It is the main object of this invention to provide an improved spraying apparatus which is effective in the spraying of grape vines and the like when in leaf.

A further object is to provide an improved spraying apparatus which may be used as an attachment or mounted upon spraying equipment now quite commonly used.

Objects pertaining to details and economies of construction and operation of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation of my improved spraying apparatus mounted upon the tank or body of a spraying outfit.

Fig. II is a detail plan view.

Fig. III is an enlarged detail section on a line corresponding to line 3—3 of Fig. I.

Fig. IV is a detail longitudinal section of one of the spreader fingers.

In the drawing similar reference numerals indicate similar parts throughout the several views.

Referring to the drawing, 1 represents the tank of a spraying outfit, the accompanying engine and pump not being illustrated. My improved spraying apparatus comprises a frame 2 preferably formed of pipe, the frame being rectangular and one of the upright members 3 thereof constituting a supporting pivot. The supporting eyes 4 on the vehicle pivotally support the frame.

The frame is provided with a handle 5 by means of which it may be swung in the horizontal plane. The spray pipe 6 is mounted in a vertical position at the outer end of the frame and is provided with a plurality of nozzles 7. The spray solution is supplied to the pipe through the flexible conduit 8.

I provide a spreader comprising the head bar 9 which is pivotally supported at 10 upon the frame, this head bar being, in the structure illustrated, a piece of pipe. The head bar is provided with a plurality of fingers 11 consisting of the rods 12 with flexible tubing 13 thereon, the ends of the tubing projecting beyond the rods providing flexible terminals 14. The coiled spring 15 is connected to the rearwardly projecting arm 16 on the head bar so that the spreader is held yieldingly forward.

A rope 17 limits the outward movement of the spreader fingers. It will be observed that the head bar is mounted in front of the spray nozzles and that the spray nozzles are directed between the fingers.

In practice the vehicle is driven along the row of grape vines to be sprayed, the operator manipulating the handle 5 to swing the frame so that the fingers of the spreader brush across the vines, opening and spreading the leaves and deflecting the same so that the spray is discharged to the inner sides of the leaves and upon the vines. The flexible extensions of the fingers prevent injury to the vines, which, at certain seasons, are quite delicate on account of the tender new growth.

My improved spraying apparatus is very efficient and convenient to use.

Having thus described my invention what I claim as new and desire to secure by Letters Patent is:

1. In a spray apparatus, the combination of a supporting frame, a vertically disposed spray pipe carried thereby and having a plurality of laterally directed spray nozzles, a spreader comprising a vertically disposed head bar pivotally mounted on said frame in front of said spray nozzles, fingers mounted on said head bar to swing in planes between said nozzles, said fingers comprising rods having coverings of flexible tubing disposed with the ends of the tubing projecting beyond the ends of the rods providing flexible ends for the fingers, a spring for yieldingly supporting said spreader with its fingers in an outwardly projecting rearwardly inclined relation, and means for limiting the outward swing of said fingers under the action of said spring.

2. In a spray apparatus, the combination of a supporting frame, a vertically disposed spray pipe carried thereby and having a plurality of laterally directed spray nozzles, a spreader comprising a vertically disposed head bar pivotally mounted on said frame in front of said spray nozzles, fingers mounted on said head bar to swing in planes between said nozzles, a spring for yieldingly supporting said spreader with its fingers in an outwardly projecting rearwardly inclined relation, and means for limiting the outward swing of said fingers under the action of said spring.

3. In a spray apparatus, the combination of a pivotally mounted supporting frame provided with a handle, a spray element carried thereby, a spreader comprising a vertically disposed head bar pivotally mounted on said frame in front of said spray element, fingers mounted on said head bar, and a spring for yieldingly supporting said spreader with its fingers in an outwardly projecting relation relative to said spray element.

4. In a spray apparatus, the combination of a supporting frame, a spray element carried thereby, a spreader comprising a vertically disposed head bar pivotally mounted on said frame in front of said spray element, fingers mounted on said head bar, and a spring for yieldingly supporting said spreader with its fingers in an outwardly projecting relation relative to said spray element.

5. In a spray apparatus, the combination of a frame, a sprayer mounted on the outer end of said frame, a spreader pivotally mounted on said frame in advance of said sprayer and comprising a plurality of fingers having flexible ends, and means for yieldingly supporting said spreader with its fingers in an outwardly projecting rearwardly inclined relation.

6. In a spray apparatus, the combination of a pivotally mounted frame provided with a handle, a sprayer mounted on the outer end of said frame, a spreader pivotally mounted on said frame in advance of said sprayer and having a plurality of fingers, and means for yieldingly supporting said spreader with its fingers in an outwardly projecting rearwardly inclined relation.

7. In a spray apparatus, the combination of a sprayer, a pivotally mounted spreader having fingers comprising rods having coverings of flexible tubing disposed with the ends of the tubing projecting beyond the ends of the rods providing flexible ends for the fingers, and a spring for yieldingly supporting said spreader with its fingers in an outwardly projecting relation relative to said sprayer.

8. In a spray apparatus, the combination of a pivotally mounted spreader provided with a plurality of fingers having flexible ends, and means for yieldingly supporting said spreader with its fingers in an outwardly projecting rearwardly inclined relation relative to said sprayer.

9. In a spray apparatus, the combination of a sprayer, a pivotally mounted spreader provided with a plurality of fingers, and means for yieldingly supporting said spreader with its fingers in an outwardly projecting rearwardly inclined relation relative to said sprayer.

In witness whereof, I have hereunto set my hand.

LAWRENCE B. LE DUKE.